Oct. 8, 1968   P. KRAUS   3,404,581
BALL SCREW ACTUATOR
Filed April 18, 1967   2 Sheets-Sheet 1

INVENTOR:
Peter Kraus
ATTORNEYS

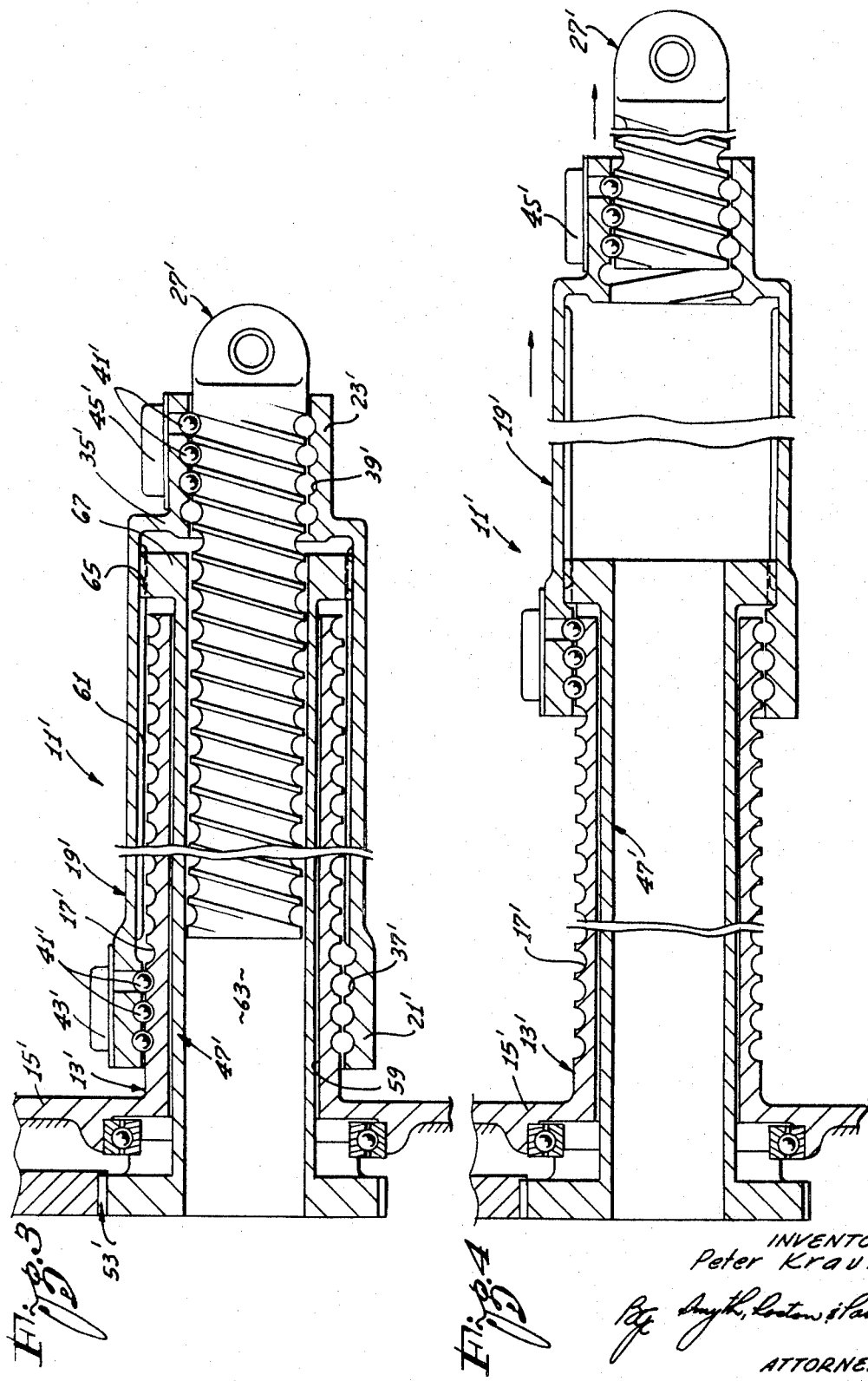

United States Patent Office 3,404,581
Patented Oct. 8, 1968

3,404,581
BALL SCREW ACTUATOR
Peter Kraus, Palos Verdes Peninsula, Calif., assignor to Sargent Industries, Inc., a corporation of Delaware
Filed Apr. 18, 1967, Ser. No. 631,625
7 Claims. (Cl. 74—424.8)

ABSTRACT OF THE DISCLOSURE

This disclosure describes a ball screw actuator which includes an inner nonrotary screw connectible to a support, a tubular intermediate member having innner and outer nut portions thereon with the inner nut portion being mounted on the inner nonrotary screw to permit rotation and translation of the tubular intermediate member relative thereto, an outer nonrotary screw mounted within the outer nut portion of the tubular intermediate member, and a rotary input member drivingly engageable with the intermediate member to rotate the intermediate member. Rotation of the intermediate member moves the intermediate member and the outer nonrotary screw between an extended position and a retracted position.

Background of the invention

This invention relates to extendible actuators and more particularly to ball screw actuators. A typical ball screw actuator of the type to which the present invention is directed includes various arrangements of nut and screw members arranged to efficiently convert rotary input motion into linear translatory motion. Confronting surface portions of adjacent nut and screw members are grooved to provide races for sets of balls. Upon rotation of one of the members, the balls associated therewith circulate in the race and through a return tube provided on the exterior of the nut. Rotation of the appropriate member of the device will cause either extension or retraction of the actuator.

Ball screw actuators of this type are used generally to convert rotary motion into linear motion or to convert linear motion to rotary motion with high efficiency. Ball screw actuators are also useful in obtaining substantial speed reduction with high efficiency. Ball screw actuators may be used, for example, in automotive steering systems, in landing gear for aircraft, for various purposes at missile launching sites, etc.

It is sometimes necessary or desirable to use ball screw actuators for applications in which the ball screw actuator is subjected to substantial compressive column loads. One problem is to construct the ball screw actuator sufficiently strong to withstand the compressive column loads. This problem of compressive column loads is particularly acute when the ball screw actuator is unusually long. Of course, even slight deflection of the ball screw actuator prevents it from operating at high efficiency.

The obvious solution to this problem is to merely increase the overall size and strength of the conventional ball screw actuator. One difficulty with doing this is that the ball screw actuator size is increased at regions in which such increase of size is not necessary. This results in wasting of material, an increased cost of manufacture, and the ball screw actuator becoming unduly heavy. This added weight is particularly undesirable when the ball screw actuator is to be used in an aircraft application and is further undesirable in transporting of the ball screw actuator.

Ball screw actuators are driven either internally or externally. With an external drive, a tubular rotary input member having relatively short internal splines engages external splines on the outer surface of an actuator member. The advantage of this construction is that the relatively long external splines are easy to machine. However, with the external drive the rotary input member must be of relatively large diameter and therefore additional weight is added to the actuator. For some applications, including those in which a weight penalty is undesirable, it is preferable to use an internal drive. When an internal drive is used the rotary input member is of relatively small diameter for a given size actuator and carries short external splines which cooperate with long internal splines on the intermediate member. This materially reduces the weight of the actuator. However, because the internal splines are of substantial length, it becomes more difficult to manufacture the actuator because such internal splines are difficult to machine.

Summary of the invention

The present invention provides a ball screw actuator having high resistance to compressive column loads. This advantageous result is accomplished without wasting of material or unnecessarily increasing the weight of the actuator.

With respect to increasing the resistance to compressive column loads, the present invention teaches strengthening of the intermediate section of the ball screw actuator so that when the actuator is in the extended position it will afford substantial resistance to comperssive column loads. It is known that the intermediate section of an elongated member which is subjected to compressive column loads experiences maximum bending. It is also known that compressive column loading is not particularly problematical when the actuator is in the retracted position. Accordingly, it is important that the intermediate section of the ball screw actuator in the extended position be stronger than either of the two end portions. The present invention provides this increased strength at the intermediate section without also unnecessarily strengthening or increasing the weight of the end portions of the device.

This teaching of the present invention can be conveniently implemented by providing an extendible actuator which includes an inner nonrotary screw connected to a support, an intermediate tubular member and an outer nonrotary screw. The tubular intermediate member has inner and outer nut portions thereon which receive portions of the inner nonrotary screw and the outer nonrotary screw, respectively. A rotary input member drives the actuator between extended and retracted positions. As used in the preceding sentence, the words "inner," "intermediate," and "outer" have reference to the relative axial distances between the respective members and the support in the extended position of the actuator. Thus, the inner nonrotary screw is closest to the support and the outer nonrotary screw is extendible a predetermined distance from the support.

As the nut portions of the intermediate member are mounted on the inner and outer screws, the intermediate member is inherently of larger diameter than either the inner or outer screws. Thus, the intermediate member has a cross-sectional configuration offering higher resistance to the column load of the actuator than either of the inner or outer nonrotary screws.

As it is desirable to telescope one of the nonrotary screws within the other in the retracted or collapsed position of the actuator, it is preferred to provide one of these screws with a recess sufficiently large to house the other of the screws. This, of course, causes the outside diameter of the two nonrotary screws to be different. This in turn necessitates the use of nut portions on the intermediate member of different diameters. When this structure is employed, it is desirable to utilize a tubular member having an intermediate portion with a diameter greater than the diameter of either of the nonrotary screws.

The ball screw actuator of this invention may be driven either internally or externally. With an internal drive, the rotary input member drives the actuator internally and is of relatively small diameter to provide a low weight drive. With an external drive, the rotary input member is tubular and drivingly engages the exterior of the intermediate member.

Ball screw actuators of the present invention preferably include one or more races defined by internal and external grooves on the cooperating nut and screw portions. Each of these races contains a set of balls which circulate therethrough when the nut and screw members are rotated relative to each other. Return tubes are provided to recirculate the balls in the conventional manner.

The invention, both as to its organization and method of operation, together with further features and advantages thereof, may best be understood by reference to the following description taken in connection with the accompanying drawings.

Brief Description of the Drawings

FIG. 3 is a longitudinal sectional view through a modified form of ball screw actuator with the actuator having an internal drive and being illustrated in the retracted position thereof.

FIG. 4 is a longitudinal sectional view through the actuator of FIG. 3 with the actuator being illustrated in the extended position.

Description of the preferred embodiments

Figure 1:
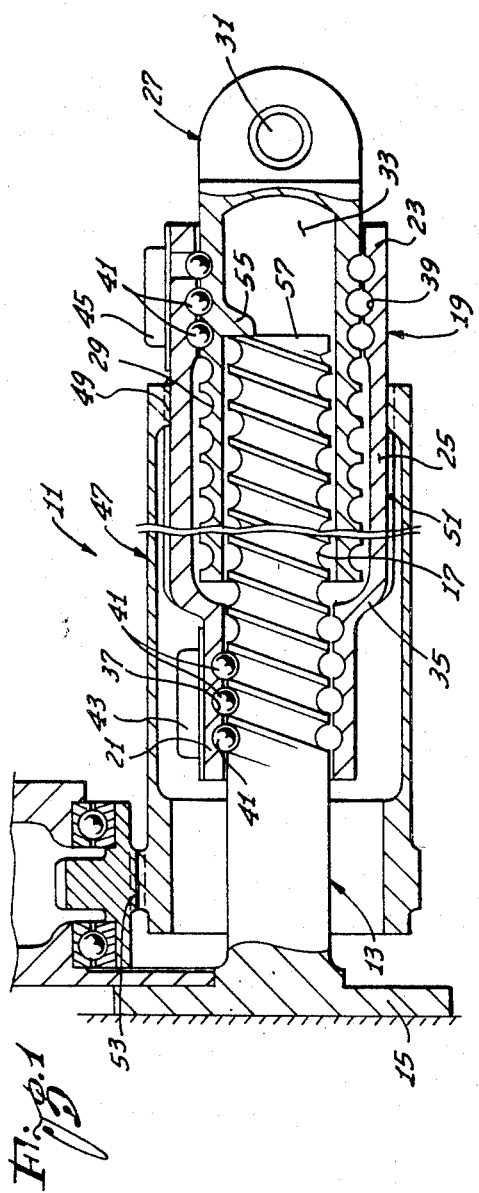
FIG. 1 is a longitudinal sectional view through on form of ball screw actuator with the actuator having an external drive and being shown in the retracted position.
Figure 2:
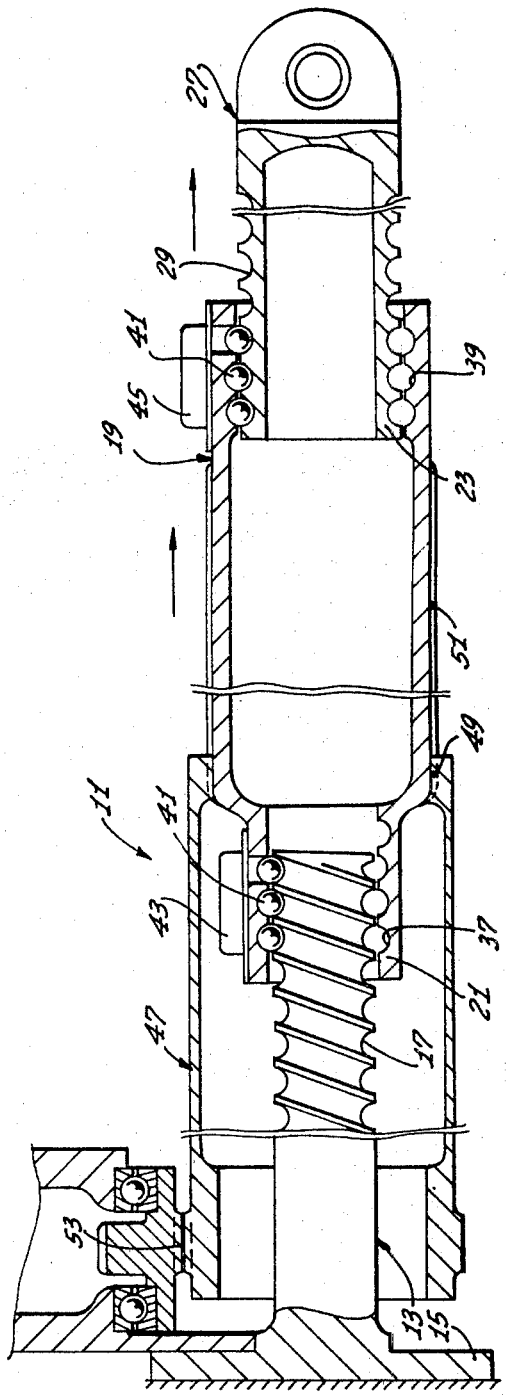
FIG. 2 is a longitudinal sectional view similar to FIG. 1 with the actuator being illustrated in the extended position.

Referring to the drawings and in particular to FIGS. 1 and 2 thereof, reference numeral 11 designates one form of a ball screw actuator constructed in accordance with the teachings of the present invention. The ball screw actuator 11 includes an inner nonrotary screw 13 which is connected to a suitable support 15. The inner nonrotary screw 13 may be tubular to reduce the weight thereof and has a plurality of spiral external grooves 17 extending over a substantial length of the external surface thereof.

A tubular intermediate member 19 is provided with an inner nut portion 21 and an outer nut portion 23, with the inner nut portion receiving the inner nonrotary screw 13. The nut portions 21 and 23 in the embodiment illustrated are separated by an intermediate portion 25 of the tubular intermediate member 19. The nut portions 21 and 23 are preferably short relative to the length of the intermediate portion 25.

Received within the outer nut portion 23 is an outer nonrotary screw 27 which has a spiral groove 29 formed over a large length of the exterior surface thereof for cooperation with the outer nut portion 23. The outer nonrotary screw is provided with suitable attachment means 31 for securing the latter to an actuatable member (not shown) which prevents rotation of the outer nonrotary screw 27 but allows translation thereof to appropriately actuate the actuatable member.

The outer nonrotary screw 27 is provided with an axial recess 33 opening toward the support 15. The recess 33 is of sufficient length and diameter to receive a substantial portion of the inner nonrotary screw 13 in the retracted position shown in FIG. 1. It should be noted that the screw 27 has a larger outside diameter than the screw 13. It is necesary, therefore, that the intermediate member 19 have a shoulder 35 thereon to allow the nut portion 21 to be of reduced diameter in order to cooperate with the relatively small diameter nonrotary screw 13. Except for the inner nut portion 21, both the inner and outer diameters of the tubular intermediate member 19 are greater than the outside diameters of either of the screws 13 or 27.

The groove 17 and the inner nut portion 21 cooperate to define a first race 37 and the grooves 29 and the outer nut portion 23 define a second race 39. Each of the races 37 and 39 contain a plurality of balls 41 which are allowed to circulate therein in the conventional manner. Return tube means 43 and 45 are secured to the nut portion 21 and the nut portion 23, respectively. The return tube means 43 and 45 may be of any conventional design and serve to recirculate the balls 41 in the conventional manner.

In the embodiment shown in FIGS. 1 and 2, the actuator 11 is moved between the retracted position of FIG. 1 and the extended position of FIG. 2 by a rotary input member 47. The rotary input member 47 is tubular and carries relatively short internal splines 49 which drivingly engage relatively long external splines 51 which extend longitudinally on the exterior surface of the tubular intermediate member 19. Thus, the rotary input member 47 constitutes an external drive for the actuator 11. The rotary input member 47 may be driven from any suitable power source (not shown) through suitable rear means 53.

Suitable stops may be provided to limit the extending and retracting movements of the actuator 11. For example, a stop 55 in the form of an internally projecting finger on the screw 27 may be used to engage the outer end 57 of the inner screw 13 to prevent further retraction of the actuator.

In the retracted position the inner screw 13 is telescoped within the outer screw 27 and the outer screw is telescoped within the intermediate member 19. The intermediate member 19 is housed within the rotary input member 47.

In operation of the actuator 11, rotational movement is imparted to the rotary input member 47 through the gear means 53. Assuming that the actuator 11 is in the retracted position, the rotary input shaft would be rotated in a direction to cause extension of the actuator. Rotation of the rotary input member 47 drives the tubular intermediate member 19 through the splines 49 and 51. As the inner nonrotary screw 13 is fixed to the support 15, the relative rotational movement between the intermediate member 19 and the inner screw 13 will cause translation of the intermediate member along the inner screw 13 in the axial direction. Similarly, as the outer screw 27 is suitably held against rotation, the relative rotation between it and the intermediate member 19 will cause axial translatory movement of the outer screw 27 relative to the intermediate member 19. Thus, the intermediate member 19 and the outer screw 27 are extended to the position shown in FIG. 2. Of course, the spiral grooves 17 and 29 and the nut portions 21 and 23 are appropriately formed to achieve this desired relative movement. During rotation of the rotary input member 47, the balls 41 circulate through the races 37 and 39 and the return tube means 43 and 45 in the conventional manner.

With respect to the embodiment of FIGS. 1 and 2, it is important to note the relative diameters of the intermediate member 19 and the screws 13 and 27. Thus, with this embodiment of the invention, only the intermediate member 19 has an enlarged diameter so that the intermediate member is strengthened to withstand substantial column loads, whereas the screws 13 and 27 are of smaller diameter because the bending force on them is much less than the bending force on the intermediate member 19.

FIGS. 3 and 4 illustrate a modification of the embodiment of FIGS. 1 and 2. FIGS. 3 and 4 show a ball screw actuator 11' which is functionally very similar to the embodiment of FIGS. 1 and 2 in that it provides high resistance to compressive column loads. Further, the ball screw actuator 11' is structurally similar to the actuator 11 in that the former contains the same components as the latter; however, some of the components are sized and arranged differently to permit the actuator 11' to be driven internally. Thus, the actuator 11' may be utilized where it is desired to employ an actuator having low weight or where space is at a premium. For clarity, the elements of the actuator 11' that correspond to elements of the actuator 11 are designated by corresponding primed reference characters.

The ball screw actuator 11' includes an inner nonrotary screw 13' having spiral grooves 17' in the outer surface thereof. The inner screw 13' is fixed to a suitable support 15' so that it can neither rotate nor translate relative thereto. The inner screw 13' has a cylindrical passageway 59 extending therethrough.

The tubular intermediate member 19' has nut portions 21' and 23' with the nut portion 21' receiving the inner screw 13'. The intermediate member 19' differs from the intermediate member 19 in that the former has longitudinally extending internal splines 61 of substantial length and the shoulder 35' is formed on the opposite end of the intermediate member 19' to permit the nut portion 23' to be of smaller diameter than the nut portion 21. The actuator 11' has an outer nonrotary screw 27' which may be identical to the outer nonrotary screw 27 except that the former may be of smaller diameter, if strength considerations permit, as it is not necessary that any member be telescoped therewithin.

The actuator 11' has a rotary input member 47' having a cylindrical passageway 63 extending therethrough. The rotary input member 47' is driven through suitable gear means 53' and is telescoped within the inner nonrotary screw 13' and has the outer nonrotary screw 27' telescoped therewithin as shown in FIG. 3. The rotary input member 47' has relatively short external splines 65 formed on an annular flange 67 at the outer end of the input member. The actuator 11' also includes races 37' and 39', balls 41' in each of the races, and return tube means 43' and 45' substantially as described above in connection with the embodiment of FIGS. 1 and 2.

The operation of the modification of FIGS. 3 and 4 is identical to the operation of the embodiment of FIGS. 1 and 2 except that the former employs an internal drive arrangement. Thus, the rotary input member 47' can be of smaller diameter than the input member 47 and extends internally into the intermediate member 19' to drive the latter. Accordingly, by rotating the rotary input member 47', the actuator 11 can be moved between the positions shown in FIGS. 3 and 4.

Although exemplary embodiments of the invention have been shown and described, many changes, modifications and substitutions may be made by one having ordinary skill in the art without necessarily departing from the spirit and scope of this invention.

I claim:
1. In an extendible actuator attachable to a support and an actuatable member, the combination of:
an inner nonrotary screw connectible to the support;
a rotatable and translatable generally tubular, intermediate member, said intermediate member including inner and outer nut portions and generally axially extending splines, said inner nut portion being mounted on said inner nonrotary screw to permit rotation and translation of said tubular intermediate member relative thereto;
an outer nonrotary screw mounted within said outer nut portion of said tubular intermediate member and connectible to the actuatable member;
a rotary input member rotatably mountable on the support and having generally axially extending splines which are drivingly engageable with the splines of said intermediate member to rotate said intermediate member, rotation of said intermediate member in one direction moving said tubular intermediate member and said outer nonrotary screw generally axially outwardly relative to said inner nonrotary screw to an extended position and rotation of said intermediate member in a direction opposite to said one direction moving said tubular intermediate member and said outer nonrotary screw to a retracted position; and
the outer diameter of said intermediate member over a major portion of the length thereof being greater than the diameter of either of said inner or outer nonrotary screws whereby said intermediate member has a cross section which offers higher resistance to column loading of the actuator in said extended position than either of said inner and outer nonrotary screws.

2. A combination as defined in claim 1 wherein said rotary input member includes a sleeve, said splines on said rotary input member are internal splines carried by said sleeve, and the splines on said intermediate member are external and engage the internal splines.

3. A combination as defined in claim 1 wherein said outer nonrotary screw has an axial recess therein opening toward said inner nonrotary screw for at least partially receiving said inner nonrotary screw in said retracted position.

4. A combination as defined in claim 1 wherein the splines on said intermediate member are internal, said rotary input member extends through said inner screw and the splines on said rotary input member are external and engage said internal splines.

5. In an extendible actuator attachable to a support and an actuatable member to extend and retract the actuatable member, the combination of:
an inner nonrotary screw connectible to the support;
a rotatable and translatable tubular intermediate member having inner and outer nut portions thereon, said inner nut portion being mounted on said inner nonrotary screw, said intermediate member and said inner nonrotary screw, said intermediate member and said inner screw having cooperating grooves defining a first race;
a series of balls in said first race to permit rotation and translation of said tubular intermediate member relative said inner screw with high efficiency;
an outer nonrotary screw mounted within said outer nut portion of said tubular intermediate member and connectible to the actuatable member to extend and retract the latter, said outer nut portion and said outer screw having grooves defining a second race;
a series of balls within said second race to permit rotation and translation of said intermediate member relative to said outer screw with high efficiency;
a rotary input member connectible to the support for rotation about an axis which generally coincides with the axis of rotation of the intermediate member, said rotary input member being drivingly engageable with said intermediate member to rotate said intermediate member, rotation of said intermediate member in one direction moving said tubular intermediate member and said outer nonrotary screw generally axially otuwardly relative to said inner nonrotary screw to an extended position and rotation of said intermediate member in a direction opposite to said one direction moving said tubular intermediate member and said outer nonrotary screw to a retracted position; and
said inner and outer nut portions being separated by a section of said intermediate member and the outer diameter of said section of said intermediate member being greater than the diameter of either of said inner or outer nonrotary screws whereby said intermediate member has a cross-sectional configuration which offers higher resistance to column loading of the actuator in said extended position than either of said inner and outer nonrotary screws.

6. A combination as defined in claim 5 wherein said outer nonrotary screw has an axial recess therein opening toward said inner nonrotary screw for at least partially receiving said inner nonrotary screw in said retracted position.

7. A combination as defined in claim 5 wherein said rotary input member includes a sleeve mountable for rotation on the support and having at least a portion of said inner screw telescoped therewithin, said sleeve having internal splines thereon, said intermediate member having external splines engaging said internal splines and being drivable thereby, one of said screws having a recess therein to telescopically receive the other of said screws in said retracted position.

References Cited

UNITED STATES PATENTS 1,708,450  4/1929  May _____ 74—424.8

FOREIGN PATENTS 1,267,639  6/1961  France.
239,305  9/1925  Great Britain.
240,616  10/1925  Great Britain.

FRED C. MATTERN, JR., *Primary Examiner.*

LEONARD H. GERIN, *Assistant Examiner.*